United States Patent [19]

DeBergalis

[11] Patent Number: 4,577,007
[45] Date of Patent: Mar. 18, 1986

[54] POLYMERS CONTAINING RESORCINOL MONOBENZOATE

[75] Inventor: Michael DeBergalis, Wilmington, Del.

[73] Assignee: E. I. Du Pont de Nemours and Company, Wilmington, Del.

[21] Appl. No.: 684,938

[22] Filed: Dec. 21, 1984

Related U.S. Application Data

[62] Division of Ser. No. 469,689, Feb. 25, 1983, Pat. No. 4,522,971.

[51] Int. Cl.[4] ............................................. C08F 22/10
[52] U.S. Cl. .................................. 526/321; 524/547;
524/548; 524/555; 524/556; 524/558; 524/559;
524/560; 525/132; 525/322.3; 525/328.2;
525/328.9; 525/384
[58] Field of Search ............... 524/547, 548, 555, 556, 524/558; 559, 560; 525/132, 327.3, 328.2, 328.9, 384; 526/321

[56] References Cited

U.S. PATENT DOCUMENTS

| | | | |
|---|---|---|---|
| 2,970,066 | 1/1961 | Brasure | 117/33.3 |
| 3,288,880 | 11/1966 | Tocker | 260/828 |
| 3,328,491 | 6/1967 | Fertig et al. | 260/901 |
| 3,340,231 | 9/1967 | Fertig et al. | 260/47 |
| 3,341,493 | 9/1967 | Goldberg et al. | 260/47 |
| 3,365,421 | 1/1968 | Horton et al. | 260/47 |
| 3,418,397 | 12/1968 | Tocker | 260/900 |
| 3,429,852 | 2/1969 | Skoultchi | 260/47 |
| 3,441,545 | 4/1969 | Blatz et al. | 260/78.5 |
| 3,445,423 | 5/1969 | Sunshine et al. | 260/45.85 |
| 3,445,566 | 5/1969 | Skoultchi | 424/47 |
| 3,595,602 | 7/1971 | Oppelt et al. | 8/74 |
| 3,956,269 | 5/1976 | Sheppard et al. | 260/192 |
| 4,208,465 | 6/1980 | Chang | 428/416 |
| 4,210,612 | 7/1980 | Karrer | 525/204 |
| 4,294,949 | 10/1981 | Karrer | 526/262 |
| 4,308,362 | 12/1981 | Wiezer et al. | 525/328 |
| 4,310,650 | 1/1982 | Gupta et al. | 526/313 |
| 4,328,346 | 5/1982 | Chung et al. | 548/110 |
| 4,355,071 | 10/1982 | Chang | 428/334 |
| 4,362,895 | 12/1982 | Gupta et al. | 136/256 |
| 4,372,835 | 2/1983 | Chung et al. | 204/159.13 |

FOREIGN PATENT DOCUMENTS

| | | |
|---|---|---|
| 0029595 | 6/1981 | European Pat. Off. |
| 2642374 | 3/1978 | Fed. Rep. of Germany |
| 2642386 | 3/1978 | Fed. Rep. of Germany |
| 2820419 | 11/1978 | Fed. Rep. of Germany |
| 2748362 | 5/1979 | Fed. Rep. of Germany |

OTHER PUBLICATIONS

Prof. Dr. H. Batzer, "Polymere 2,2,6,6-Tetraalkyl-piperidin-Derivate, 1 . . . ", Makromol Chem. 181, 595–663, (1980).

D. R. Olson, "UV Absorber Progenitors: Photo-Fries Rearrangements of Sulfonate Esters of Hydroxyphenyl-benzotriazoles" J. App. Pol. Scie. 28, 1159–1165, (1983).

*Primary Examiner*—Joseph L. Schofer
*Assistant Examiner*—Bernard Lipman

[57] ABSTRACT

Resorcinol monobenzoate is reacted through the hydroxyl group preferably with an acrylic prepolymer containing glycidyl methacrylate. The product can be used in coating compositions and films to give highly ultraviolet absorbent properties.

6 Claims, No Drawings

POLYMERS CONTAINING RESORCINOL MONOBENZOATE

This is a division of application Ser. No. 469,689, filed Feb. 25, 1983, now U.S. Pat. No. 4,522,971.

BACKGROUND

This invention involves polymer-bound ultraviolet absorbing stabilizers. More particularly, it involves the use of such stabilizers in coating compositions.

Many types of organic compositions, including coating, fibers, films, moldings and dyes, are sensitive to and degraded by ultraviolet radiation. The usual source of such radiation is sunlight, although fluorescent and arc lamps also provide more or less.

Various means are used to minimize the deleterious effects of such degradation. Ultraviolet absorbing stabilizers absorb the ultraviolet radiation and ultimately convert it largely to heat at low enough levels that the heat is much less deleterious than the radiation. Some may also be converted to less deleterious types of radiation such as visible light. Ultraviolet sensitizers also absorb ultraviolet radiation but use it generally to generate free radicals which can be useful in initiating cross linking in specifically tailored systems but which are normally thought of an degradative or deleterious in most organic compositions. Radical quenchers serve as traps for free radicals generated by ultraviolet degradation in a degradative process and thus tend to slow or stop the propagation of undesired effects. Antioxidants retard oxidation of organic compositions and thereby minimize the secondary effect of oxidation by which ultraviolet degradation does much of its damage.

Ultraviolet absorbing stabilizers and sensitizers can both be said to be ultraviolet absorbers, but the former are good for preserving the integrity of an organic composition while the latter promote change. Free radical quenchers and antioxidants operate at a secondary level to minimize damage from free radicals and other effects caused by ultraviolet radiation, heat, ozone or other causes.

Ultraviolet absorbing stabilizers are generally monomeric, although they are sometimes provided as oligomers or with bound groups which increase the molecular weight. Increased molecular weight and the presence of reactive groups can minimize the problem caused by mobility of the unmodified stabilizer. As used in a coating, film or other organic body, an unmodified stabilizer may tend to exude from the body and bloom on the surface or even evaporate at an undesirable rate.

The use of dihydroxy benzophenone bound into an acrylic copolymer through glycidyl methacrylate and optionally blended with other polymers as a coating composition is disclosed in U.S. Pat. Nos. 3,328,491—Fertig, et al; 3,340,231—Fertig, et al; 3,341,493—Goldberg, et al; (all 1967); 3,288,880—Tocker (1966); 3,365,421—Horton, et al (1968); and 3,445,566—Skoultchi, et al (1969). Advantages mentioned include decreased migration of the ultraviolet stabilizer and improved compatability and stability. The dihydroxy benzophenone or a derivative of it is reacted first with glycidyl methacrylate or a derivative of it, and this reaction product is either homopolymerized or copolymerized with other acrylic monomers. Other polymers taught for blending into the paint include polystyrene, polypropylene, polyvinyl fluoride and chloride, vinyl chloride/vinylidene chloride copolymers, polymethyl methacrylate, isoprene, vinyl acetate and cellulosics.

Urethane polymers have been light-stabilized by incorporating into the prepolymer solution 4-amino- or 4-(3-aminopropyl)amino-2,2,6,6-tetramethylpiperidine, as disclosed in German Offenlegungsschrift Nos. 2,642,374—Pfahler, et al (1979) and 2,642,386—Oertel, et al (1976), or bis(2,2,6,6-tetramethyl-4-piperidinyl)-sebacate, as disclosed in German Offenlegungsschrift No. 2,820,419—Thomas (1978).

The effectiveness of 2,2,6,6-tetraalkylpiperidines as ultraviolet light stabilizers also is evident in the art as disclosed in German Offenlegungsschrift No. 2,748,362—Oertel, et al (1978) and by F. E. Karrer, Makromol. Chem. 181, 595–633 (1980), where in such disclosures the stabilizer is incorporated into a free radical polymerizable monomer. The stabilizer-containing monomer, for example, 2,2,6,6-tetramethyl-4-piperidyl acrylate can be homopolymerized or copolymerized with appropriate free radical copolymerizable monomers to provide polymers having improved light stability. Similar disclosures of acrylate and methacrylate monomers which contain heterocyclic groups and which are polymerizable to polymers exhibiting light stability are made in U.S. Pat. Nos. 4,210,612 (1980) and 4,294,949 (1981)—both to Karrer.

However, such ultraviolet non-absorbing stabilizers as piperidine derivatives, whether polymer-bound or not, generally are highly polar and may fail to give water resistance to coatings. Furthermore, since they act on the indirect effects of ultraviolet degradation, they can only be effective throughout the bulk thickness of a coating rather than being able to concentrate their effects at the surface as can absorbing stabilizers.

U.S. Pat. No. 4,308,362—Wiezer, et al (1981) discloses copolymers having repeat units of maleic or fumaric acid ester or amide, the ester or amide groups of which include alkylpiperidine moieties. The alkylpiperidine moieties impart light stability to the polymers. The light stabilizing portion of the polymer is characterized by low volatility, good migration stability and good compatability with the substrate polymer to which the light stability characteristic is to be imparted. Azo and peroxy free radical initiators containing ultraviolet light stabilizing groups and their use in preparing free radical initiated polymers which exhibit ultraviolet light stability are disclosed in U.S. Pat. No. 3,956,269—Sheppard, et al (1976). Numerous types of ultraviolet light stabilizing compounds, incorporated into the free radical initiator, are disclosed, for example, phenyl salicylates, o-hydroxybenzophenones, cyanoacrylates, benztriazoles and resorcinol monobenzoate. One problem with incorporating ultraviolet absorbing stabilizers in a polymer by bonding them to the polymerization initiator such as azo and peroxy initiators is that this approach inherently limits the percentage of stabilizers that can be incorporated at usefully high molecular weights. Sheppard, et al do not mention higher levels than 10% by weight of stabilizer in a coating, and they do not use more than 2 mers of stabilizer in a polymer molecule.

U.S. Pat. No. 3,429,852—Skoultchi (1969) teaches ethylenically-unsaturated benzophenone sensitizer acrylic copolymers which can be used to provide cross linking in a paint film.

U.S. Pat. No. 2,970,066—Brasure (1961) discloses urethane polymers with ultraviolet stabilizers including dihydroxy benzophenone and aryl homologs of methyl beta-resorcylate, including reacting the stabilizer with an isocyanate prepolymer, and perhaps leaving some reactive isocyanate groups in the reacted polymer.

U.S. Pat. No. 3,441,545—Blatz, et al (1969) discloses reacting ultraviolet stabilizers including dihydroxy benzophenone and stabilizer precursors including resorcinol monobenzoate with various prepolymers through an acid halide group. While useful for various purposes including some types of coatings, residual halides could cause difficulties in some end uses.

U.S. Pat. Nos. 4,310,650 and 4,362,895, both to Gupta, et al (1982), disclose acrylic-benzophenone stabilizer copolymers with residual double bonds, having no crosslinkers and a maximum of 5% stabilizer, and being copolymerized in a single step. (Parts, percentages and proportions herein are by weight except where indicated otherwise.)

Also, Chang's U.S. Pat. Nos. 4,208,465 (1980) and 4,355,071 (1982) teach that 1–20% of ultraviolet stabilizers can be used, based on paint solids, and his European Patent Publication No. 29595 (1981) teaches glycidyl acrylic polymers with melamine cross linkers and with ultraviolet stabilizers. However, his stabilizers are not polymer bound.

The above-mentioned patents are incorporated herein by reference.

The usual approach to ultraviolet stabilization is to use strongly absorbent stabilizers in low concentrations such as 0.5–3% of the total composition such as hydroxy phenyl benztriazole including Tinuvin 328 sold by Ciba Geigy. Higher concentrations have been generally thought to be uneconomical because of the high cost of the stabilizer and unstable because of mobility.

However, the present invention involves the discovery that certain types of ultraviolet absorbing stabilizers which need not have outstanding efficiency can be used in relatively high concentrations when chemically attached to a polymeric binder as a substantial part of the composition being protected.

This permits making a thin paint layer or a thin film which is quite opaque to ultraviolet radiation but which does effectively transmit visible light. This concept can be used advantageously in many applications, such as: an outer clear layer of paint over other paint layers, some of which may be pigmented; a coating on fibers or fabrics which may contain ultraviolet sensitive dyes or other constituents, coatings or films for glass to minimize ultraviolet penetration through the glass; coatings for wood or plastics; coatings, films or bulk additives in molding resins used as refractors or housing for fluorescent or arc lamps such as high pressure mercury arc lamps; hair spray to minimize sun bleaching or discoloration of hair colorants, as in U.S. Pat. No. 3,445,566—Skoultchi (1969); coatings for color photographs; and other potential applications.

The present invention seems particularly useful for a thin unpigmented clear coat to be used as the top layer of an automobile finish system which may have one or more pigmented layers over a primer, topped by one or more clear layers to enhance the aesthetics of the car, giving a higher gloss.

The present invention can provide an outer clear coat in an automotive color coat/clear coat finish system that will give strong enough ultraviolet stabilization to localize the degradation in the outer regions of the surface. Instead of intercoat adhesion failure and flaking off of the outer layers, as sometimes occurs with color coat/clear coat finishes, this can change the mode of aging to slow, minor chalking of the surface. Gloss can remain high with the refractive indices of the constituents chosen properly, and polishing can repair the effects of this type of aging.

SUMMARY OF THE INVENTION

The present invention provides a polymer of a moiety reacted with resorcinol monobenzoate, said moiety having a functional group which bonds to the hydroxyl group on the resorcinol monobenzoate, wherein the polymer contains by weight about 12.5–80%, preferably at least 15% and more preferably at least 20%, resorcinol monobenzoate, the balance being said moiety. The functional group on the moiety is a group other than an isocyanate or a polymeric acyl halide. Preferably it is at least one group selected from epoxy, amine, alcohol, ester, carboxylic acid and anhydride, ketone, aldehyde, aziridine, oxazoline, alkyl halide, monomeric acyl halide, β-alkoxy amide, hemi-aminal, alkoxy aminal, alkoxy silane, lactone, α,β-unsaturated carbonyl groups, and phosphoric acid derivatives, and the moiety is made from acrylic monomers which preferably include glycidyl methacrylate and optionally hydroxy ethyl acrylate. Nitriles and sulfonic acid groups might also be useful with this invention.

Coating compositions and films comprising such polymers and containing at least about 12.5% preferably at least about 15–50% more preferably about 20%, resorcinol monobenzoate are also part of the invention, as are coating compositions containing liquid carriers, either aqueous or based on organic solvents, as well as dry powder coating compositions. The polymer contains an average of at least about 0.8 mers of resorcinol monobenzoate per molecule, preferably at least about 2.1 or 2.5 mers, more preferably about 7.5 mers. The number average molecular weight of the polymer is in the range of about 1,500–45,000, preferably 3,000–10,000, more preferably 8,000–10,000 for certain systems.

Polymer-bound resorcinol monobenzoate of the invention can be prepared by reacting resorcinol monobenzoate with functional groups on a preformed polymer, or by preparing a comonomer such as of resorcinol monobenzoate and a suitable methacrylic monomer and then homopolymerizing copolymerizing the comonomer.

DETAILED DESCRIPTION

Resorcinol monobenzoate can be bonded to a polymer, such as an acrylic polymer containing an epoxy group provided by glycidyl methacrylate, through the hydroxyl group on the resorcinol monobenzoate. The resulting polymer-bound resorcinol monobenzoate, when subjected to ultraviolet radiation, absorbs part of the radiation and undergoes a photorearrangement, reportedly a photo-Fries rearrangement, to produce polymer-bound dihydroxy benzophenone. The structure of resorcinol monobenzoate is

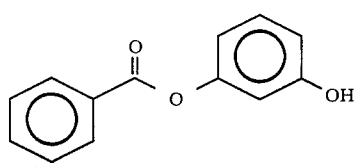

1 and the structure of dihydroxy benzophenone is

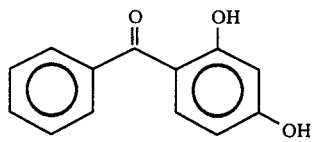

As is known, the ultraviolet stabilization effect of dihydroxy benzophenone involves interaction of the carbonyl between the rings with the hydroxyl group shown at the top of the right-hand ring, in the position ortho to the carbonyl. Since the bonding of the resorcinol monobenzoate is through the hydroxyl group, that group remains bound to the polymer in the dihydroxy benzophenone resulting from the photorearrangement. By the term "derivatives containing resorcinol monobenzoate" is meant compounds or reaction products in which the resorcinol monobenzoate retains its character and effect in performing its function in the present invention. For instance, functionalized groups of up to 14 or even more carbon atoms could be reacted with the hydroxyl, so long as the resulting product can bond effectively with the defined polymer. Although such derivatives may be used in the present invention, for maximum cost effectiveness under present circumstances, resorcinol monobenzoate itself is preferred.

Derivatives of resorcinol monobenzoate within the present invention include the following which are made by reaction with the hydroxyl group on the resorcinol monobenzoate:

3-(1,2-epoxypropyl)-resorcinol monobenzoate

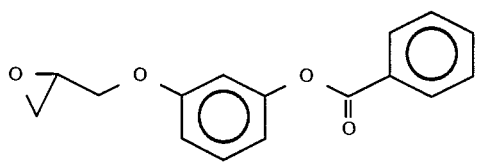

3-(1-hydroxyethyl)-resorcinol monobenzoate

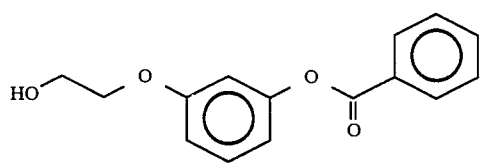

3-(1-aminoethyl)-resorcinol monobenzoate

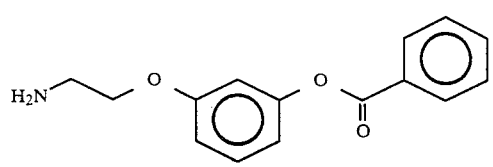

3-(trimellitic anhydrido)-resorcinol monobenzoate

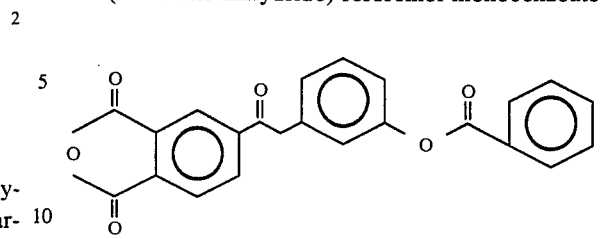

3-vinyl-resorcinol monobenzoate

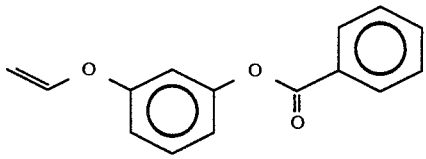

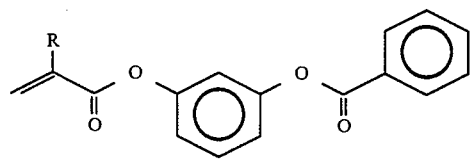

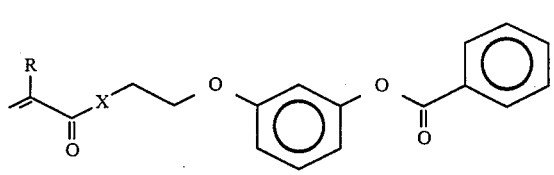

X=N or O

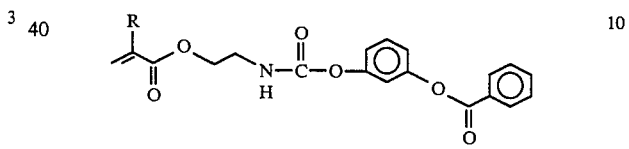

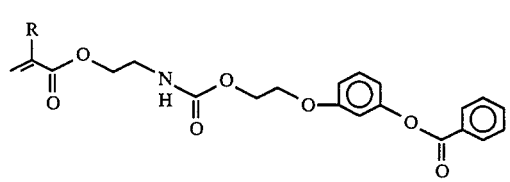

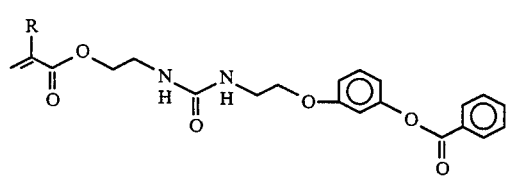

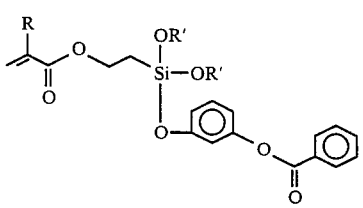

where

R=H or methyl
R'=methyl or ethyl 3-chloroformyl-resorcinol monobenzoate

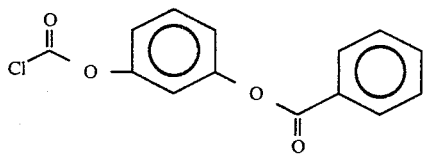

Further derivatives fit the structure

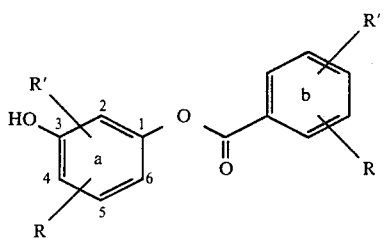

wherein R and R' are hydrogen or hydrocarbons of $C_1$–$C_{14}$, with or without reactive functionalities including halogen, oxygen, aromatics, amines and combinations of the above. Further, the disposition of this functionality must be such so as to allow at least one unsubstituted ortho position (2 or 6) on the a ring.

It will be apparent to the person skilled in the art with little or no experimentation that certain types of compositions can qualify as derivatives of resorcinol monobenzoate.

It is thought that some of the reported yellowing of coating compositions stabilized with dihydroxy benzophenone may be due to metal ions or complexing or chelating agents reacting with the stabilizer. However, when resorcinol monobenzoate is used as an absorbing stabilizer precursor such as in a film or dried coating, it does not rearrange to dihydroxy benzophenone until it is irradiated with ultraviolet light. It may be postulated that decreased mobility of metal ions or other color-causing species locked in the matrix of a consolidated film or coating relative to in the liquid state leads to lessened discoloration. It is also possible that the resorcinol monobenzoate commercially available is purer that the available dihydroxy benzophenone. Whatever the cause, yellowing reported at times in the literature with dihydroxy benzophenone has not been found to be a problem with resorcinol monobenzoate, and higher concentrations of stabilizer of the invention can be used compared to upper limits taught by the literature.

Furthermore, certain curing chemistries such as air oxidation are inhibited by phenols. Large amounts of dihydroxy benzophenone could hurt such curing chemistries. However, if resorcinol monobenzoate is used, there is no such effect if the conversion to dihydroxy benzophenone is not done until after the film or coating is cured.

Other adjuvants may be used in compositions of the invention so long as they do not harm the basic and novel characteristics of the invention. Auxiliary ultraviolet-active ingredients may be used as is often done in conventional paints, such as other absorbing stabilizers, hindered amine light stabilizers, quenchers and phenolic antioxidants. Pigments, especially light transmitting pigments of desirable refractive index, may aid in chalking and polishability. Coating compositions may be formulated with additional resins for desired effects.

Polymers for use in the present invention containing glycidyl methacrylate can be prepared by methods reported in the literature. Such polymers having a number average molecular weight between 1,500 and 45,000, preferably 3,000–10,000 for high solids enamels, can then be reacted with absorbing stabilizers which contain reactive functionality such as amine, hydroxyl or acid groups. The desired amounts of absorbing stabilizers can be incorporated into the polymer backbone by an amine, ether or ester linkage, depending upon the starting functionality, via the epoxy groups of the glycidyl methacrylate. The amount of absorbing stabilizers can be varied depending upon (1) the desired level of ultraviolet fortification, (2) the amount of residual epoxy desired for crosslinking. The amount of absorbing stabilizers incorporated can be varied between 12.5 and 50% by weight on total polymer solids, with the desired range being between 20 and 50%. The incorporation reaction occurs at temperatures between 80° and 130° C. with the desired range between 100°–110° C. Reaction time is from 1–12 hours with the optimum range being 3–8 hours.

Modified acrylic copolymers of the invention optionally can then be crosslinked using conventional crosslinkers such as melamines, isocyanates, phenolics, alkyds or other air dry systems, or preferably various di-, tri-, tetra- and poly-functional amines, either monomeric or polymeric. Particularly suitable amines include, methylene dicylohexyl 4,4'diamine, and other cycloaliphatic and aromatic diamines such as Ancamine 1618 sold by Pacific Anchor Inc., 1,6hexanediamine, hexamethoxy methyl melamine or polyamine resins such as methyl methacrylate/lauryl methacrylate/methacrylic acid/propylene imine in weight ratios such as 40/48/12/4.3 (PI stoichiometric with the MAA) at 43% solids with 1.39 milliequivalents of amine per gram of solid polymer. Alternatively, crosslinking can be done with isocyanates, either monomeric such as Desmodur N sold by Mobay, or polymeric such as styrene/butyl methacrylate/isocyanate ethyl methacrylate/N-dodecyl mercaptan in weight ratios such as 42.2/10/46/0.08. The molar ratio of crosslinker to acrylic is adjusted to give a stoichiometry between 1.0:1 and 4.0:1 with the desired range being between 1.0:1 and 3.0:1.

Such films will cure at ambient temperature, or above, depending on the crosslinker system, to give films with high gloss measured on a Glossmeter made by Lockwood McLarie of Horsham, Penn., of between 80 and 115 at a 20° angle and a hardness of 4–20 Knoop and good toughness. Lower hardnesses are also desirable and obtained for certain purposes. Further, these coatings show pronounced ultraviolet stability lasting from greater than 2,000 hours to greater than 19,000 hours in QUV testing with between 70 and 93% gloss retention, depending on the coating system. These coatings can be applied to a variety of substrates including painted surfaces, wood, plastics, glass, metal, and organic films.

EXAMPLE 1

Typical Preparations

An acrylic prepolymer with epoxy groups is produced from the following ingredients butylacrylate/hydroxyethylacrylate/glycidyl methacrylate in weight ratios of 49/4/37.

The prepolymer is made by standard vinyl polymerization techniques. Thus, the above monomers are combined with 0.5–7% of a free-radical initiator. This mixture is fed into a solvent (e.g., 2-heptanone) held at a controlled temperature to yield the solution polymer.

The above prepolymer is then combined and reacted with enough resorcinol monobenzoate to yield a polymer containing 20–50% ultraviolet stabilizer. This reaction can be catalyzed, but the preferred method is uncatalyzed. The reaction is held at a temperature in the range 100°–175° C. so that excessively long reaction times and deleterious side reactions are avoided.

A typical clear enamel can be made by blending
50–80 parts acrylic ultraviolet stabilizing resins
20–50 parts hexamethoxymethylmelamine
0.1–10 parts p-toluenesulfonic acid catalyst
0–50 parts pigment and/or metallic flake
20–400 parts solvent These enamels are applied in a conventional manner such as air atomized spray and baked for 30 minutes at 120° C. to yield a hard glossy finish.

More specific preparations are given in the following examples.

EXAMPLE 2

Acrylic Prepolymer

To 1237.2 g of refluxing methyl amyl ketone (MAK) was added a solution of 834.4 g glycidyl methacrylate, 1100.0 g n-butyl acrylate, 300.0 g hydroxyethylacrylate, 125.21 g of methyl amyl ketone and 62.6 g Lupersol 70 (a 75% solution of t-butyl peracetate sold by Pennwalt) over 225 minutes. Following this feed, a solution of 62.6 g Lupersol 70 in 8.0 g MAX was added over 15 minutes. After 30 minutes of additional reflux, the resin was cooled yielding a 62% solids prepolymer.

EXAMPLE 3

Resorcinol Monobenzoate Resin

To 32.2 g of the refluxing prepolymer was added 11.26 g (0.0526 mol) resorcinol monobenzoate. This mixture was refluxed until reaction was complete, about 3 hours. This yielded a 72% solids resin containing 36.1% resorcinol monobenzoate on resin solids.

EXAMPLE 4

Clear Enamels

Clear enamels were formulated by mixing 9.83 g of the resorcinol monobenzoate resin 3.0 g Resimene 755, a fully alkylated melamine formaldehyde resin sold by Monsanto, 0.06 g 50% p-toluene-sulfonic acid monohydrate in methanol, and 3.84 g xylene. The enamels were applied to metal substrates that were precoated with a conventional silver metallic automotive enamel. The clear enamels were cured in a 121° C. oven for thirty minutes.

EXAMPLE 5

Accelerated Weathering

A QUV weathering tester made by Q Panel Company was used with an 8 hour 70° C. light cycle, and a 4 hour, 50° C. wet cycle. The formulations tested were:
A: The resorcinol monobenzoate enamel described in Example 4.
B: A clear enamel similar to A and B but containing no ultraviolet stabilizer.
C: Enamel C containing 3% Tinuvin 328, an ultraviolet stabilizer sold by Ciba Geigy.

The results are reported in 20° gloss. A result of 100 is best.

| QUV Hours | A | B | C |
|---|---|---|---|
| 0 | 100 | 80 | 86 |
| 550 | 87 | 84 | 88 |
| 1100 | 89 | 77 | 82 |
| 1260 | 87 | 52(1) | 81 |
| 1730 | | 1 | 32 |
| 1880 | | | 11 |
| 2780 | 79 | | |
| 5460 | 57 | | |

(1): The enamel surface is cracked.

EXAMPLE 6

Proposed Preparation of a Copolymerizable Resorcinol Monobenzoate Comonomer To a 200 ml 4 neck round bottom flask equipped with a reflux condenser, nitrogen inlet, mechanical stirrer and addition funnel add resorcinol monobenzoate, 21.42 g (0.1 moles), triethylamine, 10.11 g (0.1 moles) and 40 ml of dry tetrahydrofuran. Allow this mixture to stir for 30 minutes whereupon methacryloyl chloride, 10.75 g (0.1 moles) in 25 ml of dry tetrahydrofuran is added dropwise over 30 minutes. The reaction is allowed to continue until all starting material is consumed, as determined by thin layer chromatography. At this point the reaction mixture is diluted with ethyl ether, 1,500 ml, and washed 3 times with 100 ml of 10% HCl, water and brine. The ethereal fraction was dried over magnesium sulfate and concentrated to give the desired methacryloyloxy resorcinol monobenzoate. Theoretical yield: 28.3 g. Since the methacryloyl chloride is monomeric, it is relatively easy to dispose of the halide residues. It would be much more difficult if a polymeric acyl halide were provided as a reactant.

EXAMPLE 7

Preparation of Acrylic Epoxy Prepolymer

To a 3l 4-neck round bottom flask equipped with a reflux condenser, mechanical stirrer, two addition funnels, temperature probe and nitrogen inlet was added 1200 g of toluene. The solvent was brought to reflux temperature and the monomer and initiator feeds were begun. The monomer feed of methyl methacrylate, 300 g; butyl methacrylate, 600 g; and glycidyl methacrylate, 600 g, was added over 3 hours while the initiator feed of VAZO-67, 30 g; an azobis isobutyronitrile polymerization initiator sold by Du Pont, and toluene, 150 ml, was added over 3.5 hours. After complete addition, the polymer solution was held at reflux temperature for an additional hour and then cooled to room temperature. The final resin solution contained 54% solid polymer. Gel Permeation Chromatography showed the resin to have a number average molecular weight ($M_N$) of 8800 and a weight average molecular weight ($M_w$) of 20,000.

EXAMPLE 8

This example is representative of the post reaction sequence for the attachment of the ultraviolet stabilizer to the acrylic prepolymer.

A 1 liter 4 neck round bottom flask, equipped with a reflux condenser, mechanical stirrer, temperature probe and nitrogen inlet was charged with 300 g of the acrylic polymer described in Example 7, 63 g of resorcinol monobenzoate, 56 ml of tetrahydrofuran and 0.1 g of Irganox 1010, a hindered phenolic antioxidant sold by Ciba Geigy. The reaction mixture was heated at reflux for six hours and then cooled to room temperature. The resin which contained 25% of the ultraviolet stabilizer, resorcinol monobenzoate, was a clear, slightly yellow resin solution. Acrylic polymers containing higher or lower percentages of ultraviolet stabilizer can be prepared in an analogous manner by adjusting the amount of stabilizer added to the prepolymer.

EXAMPLE 9

300 g of acrylic resin described in Example 7 was added to a 1 liter 4 neck round bottom flask equipped with a mechanical stirrer, reflux condenser, temperature probe and nitrogen inlet. The resin was brought to reflux temperature and treated with 100.3 g of resorcinol monobenzoate in 50 g of tetrahydrofuran. The reaction mixture was heated at reflux temperature for six hours and then cooled. The acrylic polymer which contained 37% of the ultraviolet stabilizer by weight of polymer solids was a clear, slightly yellow solution.

EXAMPLE 10

This example demonstrates the procedure for crosslinking and forming clear films/coatings with the acrylic polymers described in Example 8.

The acrylic polymer described in Example 8 can be crosslinked and formed into a clear film or coating by blending 1-1.7 g of Ancamine ® 1618, a cycloaliphatic amine crosslinking agent sold by Pacific Anchor Co., with 15 g of the acrylic polymer described in Example 8. For application, the above-mentioned blend is diluted to the desired viscosity with a solvent mixture of toluene/xylene/Cellosolve acetate, an ethylene glycol monoethyl ether acetate sold by Union Carbide, and 0.1 g of Irganox 1010, a hindered phenolic antioxidant sold by Ciba Geigy. The finish can then be applied by spray or brush to the desired surface and allowed to cure at ambient temperature or baked at 82° C. for 30 minutes. Ambient cured systems give solvent resistant films after 3 days and baked systems after cooling to room temperature. Both baked and ambient cured films give outstanding durability as shown by 90% retention of 20° gloss after more than 2,000 hours in QUV testing.

EXAMPLE 11

This example demonstrates the procedure for crosslinking and forming clear films/coatings with acrylic polymers described in Example 9.

The ultraviolet stabilized acrylic polymer described in Example 9 can be crosslinked and formed into a clear film/coating by blending 4.2-5 g of Desmodur-N, a polyfunctional isocyanate crosslinker sold by Mobay, with 10 g of the acrylic polymer described in Example 9. For application, the mixture of the acrylic polymer and the isocyanate crosslinker is diluted with toluene/xylene/Cellosolve Acetate sold by Union Carbide (50/40/10) and 1% dibutyltin dilaurate to the desired viscosity and applied by spray or brush to the substrate. The coating can subsequently be baked at 82° C. for 30 minutes or allowed to cure at ambient temperature. Ambient cured films become solvent resistant after 5 days while baked systems are resistant after cooling. Both baked and ambient cured films show good durability maintaining 90% of their gloss after 1,000 hours in QUV testing.

EXAMPLE 12

The acrylic resin for Example 9 can also be crosslinked and formed into clear films or coatings by blending 1 part of the acrylic polymer with 2 parts of polymeric isocyanate such as methyl methacrylate/butyl methacrylate/isocyanatoethyl methacrylate/n-dodecylmercaptan (42.2/0.2/48/10) having an $M_n$ of 2,000 at 54% solids. Application is accomplished in an analogous manner to Example 11. 1% dibutyltin dilaurate added as catalyst.

EXAMPLE 13

This example demonstrates the preparation and formation of a clear, ultraviolet absorbing coating with oxidatively cures using linoleic acid esters.

300 g of the prepolymer from Example 7 was charged to a 1 liter 4 neck round bottom flask equipped with a mechanical stirrer, reflux condenser, nitrogen inlet and addition funnel. The resin solution was heated to reflux temperature and 66.5 g of resorcinol monobenzoate was added in 50 g of tetrahydrofuran. The reaction was allowed to proceed at reflux for 6 hours. Next, linloeic acid, 58 g, was added dropwise over one hour and upon complete addition the reaction mixture was allowed to reflux for an additional hour and cooled.

A clear film/coating can be formed by diluting the above polymer with an appropriate solvent blend along with 1% cobalt naphthenate to induce crosslinking. The resin can then be applied to the substrate by spraying or brushing.

I claim:

1. A process of making a polymer of a moiety reacted with resorcinol monobenzoate, said moiety having a functional group which bonds to the hydroxyl group on the resorcinol monobenzoate through a linking group, said linking group including at least one group selected from the group consisting of ether, carbonate, and urethane groups and ester groups containing at least two carbon atoms, wherein the polymer contains by weight about 12.5-80% resorcinol monobenzoate, the balance being said moiety, said functional group being a group other than an isocyanate or a polymeric acyl halide, wherein the monomer precursors of the polymeric moiety are reacted with resorcinol monobenzoate or a monomeric derivative containing resorcinol monobenzoate to produce a comonomer which is then copolymerized.

2. The process of claim 1 wherein the monomer precursor with which the resorcinol monobenzoate reacts is glycidyl methacrylate.

3. A process of making a polymer which comprises a polymeric moiety bound to resorcinol monobenzoate or a derivative containing resorcinol monobenzoate, said moiety being bound to the hydroxyl group on the resorcinol monobenzoate through a linking group, wherein the polymer contains, by weight, 12.5-80% resorcinol monobenzoate, the balance being said moiety, said linking group including at least one group selected from the group consisting of ether, carbonate, and urethane groups and ester groups containing at least two carbon atoms, said derivative fitting the structure

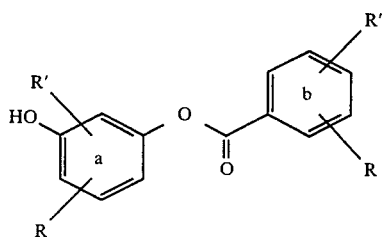

wherein R and R' are hydrogen or alkyl or alkoxy groups containing 1-14 carbon atoms, and wherein there is at least one unsubstituted position on the a ring ortho to the carbonyl groups, wherein monomer precursor of the polymeric moiety is reacted with resorcinol monobenzoate or a monomeric derivative containing resorcinol monobenzoate to produce a comonomer which is then polymerized.

4. A process of claim 3 wherein resorcinol monobenzoate is reacted with said monomer precursor to bond them together through said linking group.

5. The process of claim 4 wherein the hydroxy group on the resorcinol monobenzoate bonds to the epoxy group on glycidyl methacrylate which is in said monomer precursor.

6. The process of claim 3 wherein the resulting polymer contains, by weight, about 15-80% resorcinol monobenzoate, which has a number average molecular weight about in the range of 1,500-45,000 and which contains at least about 2.1 mers of resorcinol monobenzoate per molecule.

* * * * *